(12) United States Patent
Simonsson et al.

(10) Patent No.: US 11,139,873 B2
(45) Date of Patent: Oct. 5, 2021

(54) BEAM WIDTH ADJUSTMENT

(71) Applicant: TELEFONAKTIEBOLAGET LM ERICSSON (PUBL), Stockholm (SE)

(72) Inventors: Arne Simonsson, Gammelstad (SE);
Henrik Asplund, Stockholm (SE);
Fredrik Athley, Kullavik (SE);
Magnus Thurfjell, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/607,222

(22) PCT Filed: May 24, 2017

(86) PCT No.: PCT/SE2017/050561
§ 371 (c)(1),
(2) Date: Oct. 22, 2019

(87) PCT Pub. No.: WO2018/217144
PCT Pub. Date: Nov. 29, 2018

(65) Prior Publication Data
US 2020/0099426 A1    Mar. 26, 2020

(51) Int. Cl.
*H04W 4/00*       (2018.01)
*H04B 7/0456*    (2017.01)
*H04B 17/318*    (2015.01)
*H04B 7/0408*    (2017.01)
*H04B 7/06*       (2006.01)
*H04B 7/08*       (2006.01)

(52) U.S. Cl.
CPC ......... *H04B 7/0486* (2013.01); *H04B 7/0408* (2013.01); *H04B 7/0617* (2013.01); *H04B 7/0848* (2013.01); *H04B 17/318* (2015.01)

(58) Field of Classification Search
CPC .. H04B 17/318; H04B 7/0408; H04B 7/0486; H04B 7/0617; H04B 7/0697; H04B 7/0848
See application file for complete search history.

(56) References Cited

U.S. PATENT DOCUMENTS

2013/0244597 A1*  9/2013  Kawamoto ........... H04W 40/12
                                                            455/91
2015/0215025 A1   7/2015  Ponnuswamy
2015/0365939 A1  12/2015  Zhang et al.

OTHER PUBLICATIONS

International Search Report / Written Opinion issued in PCT/SE2017/050561 dated Feb. 20, 2018.

* cited by examiner

*Primary Examiner* — Minh Trang T Nguyen
(74) *Attorney, Agent, or Firm* — Christopher & Weisberg, P.A.

(57) ABSTRACT

There is provided mechanisms for beam width adjustment. A method is performed by a radio transceiver device. The method comprises communicating, using a current beam, with another radio transceiver device. The method comprises obtaining a signal strength indicator and a transmission rank of the current beam. The method comprises determining an adjustment indicator for adjusting beam width of the current beam for continued communications with said another radio transceiver device. The adjustment indicator is based on the signal strength indicator and the 0 transmission rank. The method comprises initiating adjustment of the beam width according to the adjustment indicator.

25 Claims, 5 Drawing Sheets

BEAM WIDTH ADJUSTMENT

TECHNICAL FIELD

Embodiments presented herein relate to a method, a radio transceiver device, a computer program, and a computer program product for beam width adjustment. Embodiments presented herein further relate to a method, a radio transceiver device, a computer program, and a computer program product for receiving reporting of beam width adjustment.

BACKGROUND

In communications networks, there may be a challenge to obtain good performance and capacity for a given communications protocol, its parameters and the physical environment in which the communications network is deployed.

For example, the so-called new radio (NR) access technology being considered for fifth generation (5G) telecommunications system could utilize so-called massive multiple-input multiple output (MIMO) systems for transmission and reception. This enables both spatial multiplexing and advanced beamforming. Beamforming is typically used with an aim to improve radio link quality and coverage whilst spatial multiplexing might improve user throughput and capacity. With sufficient number of antennas, such as used for so-called massive MIMO systems, both spatial multiplexing and advanced beamforming can be supported, enabling beamformed spatial multiplexing.

Beamforming could be implemented by means of analog beamforming, digital beamforming, or hybrid beamforming. Each implementation has its advantages and disadvantages.

FIG. 1(a) schematically illustrates an antenna arrangement lice of an analog beamforming implementation. A baseband unit 120 is operatively connected to antenna elements 150 via a beamforming network comprising phase adjusters 130 and (optional) gain adjusters 140. The phase and amplitude of each antenna element 150 are individually controllable by the phase adjusters 130 and the gain adjusters 140. The analog beamforming implementation is the least flexible of the three, but is cheap to manufacture due to a reduced number of radio chains and baseband chains compared to a digital beamforming implementation.

FIG. 1(b) schematically illustrates an antenna arrangement 110b of a digital beamforming implementation. A baseband unit 120 is operatively connected to antenna elements 150 via a precoder 160. In some aspects the baseband unit 120 has access to every antenna element and the precoder 160 is a part of the baseband unit 120. The phase and amplitude of each antenna element 150 are individually controllable by the precoder 160. The amplitude of the antenna element 150 could be further controllable by (optional) gain adjusters 170. The digital beamforming implementation is the most flexible implementation of the three but also the costliest due to the large number of required radio chains and baseband chains.

A hybrid beamforming implementation is a compromise between the analog and the digital beamforming implementations. FIG. 1(c) schematically illustrates an antenna arrangement 110c of a hybrid beamforming implementation with two analog antenna subarrays. A single baseband unit 120 is thus operatively connected to antenna elements 150 of the two analog antenna subarrays via a common precoder 160. In some aspects the precoder 160 is a part of the baseband unit 120. The phase and amplitude of each antenna element 150 are individually controllable by respective beamforming networks comprising phase adjusters 130 and gain adjusters 140. The analog subarrays can be used to create beams by analog beamforming whilst the (digital) precoder can apply additional digital beamforming of the two analog beams and/or perform spatial multiplexing of two streams over the two analog beams.

As the skilled person understands, depending on cost and performance requirements of different wireless devices, different implementations will be needed.

With both analog and digital beamforming the beams can be formed in different shapes. One characteristics of the beam is the beam width, sometimes defined as Half Power Beam Width (HPBW). Another characteristic of the beam is the beam gain, the maximum gain at beam bore sight. FIG. 2 schematically illustrates beams 180a, 180b, 180c generated by a an antenna arrangement 110a, 110b, 110c, where the beam width and beam gain is unique for each beam 180a, 180b, 180c. Beam width and beam gain are typically strongly related so that with the narrower beam the larger gain, as in FIG. 2. The beam width (and thereby the also the gain) can be changed by applying an amplitude and/or phase taper over the antenna arrangement, where the amplitude and/or phase taper are defined by beamforming weights.

Transmit beamforming, whether having an analog, hybrid, or digital implementation, is generally based on available channel state information (CSI) at the transmitter. The CSI can be obtained through measurements of known reference signals transmitted on the forward or reverse link. On the forward link, the receiver could estimate the radio propagation channel for each transmitted reference signal and reports this back to the transmitter using feedback mechanisms. Otherwise, estimates from the reverse link are used directly by the transmitter.

The reference signals and feedback mechanisms are typically standardized to ensure interoperability of different standard-compliant equipment (such as access nodes and terminal devices). There are many kinds of reference signals (such as cell specific reference Signals (CRS), demodulation reference signals (DMRS), channel state information reference signals (CSI-RS), etc.) and feedback report formats (CSI, precoding matrix indicator (PMI), rank indication (RI), etc.). The number of reference signals that may be available for a given communication link may be restricted due to limitations in the standard or hardware limitations in how many orthogonal reference signals may be transmitted (or received in case of reverse link measurements) at the same time. Typically, each unique reference signal requires a full digital transmitter/receiver for its generation or measurement. Particularly in the case of analogue or hybrid beamforming the number of antenna elements may far exceed the number of transmitter/receivers.

When there are more degrees of freedom in the beamforming (e.g. more steerable antenna elements) than there are in the CSI, the design of good beamforming weights becomes cumbersome.

Hence, there is still a need for an improved beamforming.

SUMMARY

An object of embodiments herein is to provide mechanisms that enable efficient beamforming.

According to a first aspect there is presented a method for beam width adjustment. The method is performed by a radio transceiver device. The method comprises communicating, using a current beam, with another radio transceiver device. The method comprises obtaining a signal strength indicator and a transmission rank of the current beam. The method comprises determining an adjustment indicator for adjusting beam width of the current beam for continued communications with said another radio transceiver device. The adjustment indicator is based on the signal strength indicator and the transmission rank. The method comprises initiating adjustment of the beam width according to the adjustment indicator.

According to a second aspect there is presented a radio transceiver device for beam width adjustment. The radio transceiver device comprises processing circuitry. The processing circuitry is configured to cause the radio transceiver device to communicate, using a current beam, with another radio transceiver device. The processing circuitry is configured to cause the radio transceiver device to obtain a signal strength indicator and a transmission rank of the current beam. The processing circuitry is configured to cause the radio transceiver device to determine an adjustment indicator for adjusting beam width of the current beam for continued communications with said another radio transceiver device. The adjustment indicator is based on the signal strength indicator and the transmission rank. The processing circuitry is configured to cause the radio transceiver device to initiate adjustment of the beam width according to the adjustment indicator.

According to a third aspect there is presented a radio transceiver device for beam width adjustment. The radio transceiver device comprises processing circuitry and a storage medium. The storage medium stores instructions that, when executed by the processing circuitry, cause the radio transceiver device to perform operations, or steps. The operations, or steps, cause the radio transceiver device to communicate, using a current beam, with another radio transceiver device. The operations, or steps, cause the radio transceiver device to obtain a signal strength indicator and a transmission rank of the current beam. The operations, or steps, cause the radio transceiver device to determine an adjustment indicator for adjusting beam width of the current beam for continued communications with said another radio transceiver device. The adjustment indicator is based on the signal strength indicator and the transmission rank. The operations, or steps, cause the radio transceiver device to initiate adjustment of the beam width according to the adjustment indicator.

According to a fourth aspect there is presented a radio transceiver device for beam width adjustment. The radio transceiver device comprises a communicate module configured to communicate, using a current beam, with another radio transceiver device. The radio transceiver device comprises an obtain module configured to obtain a signal strength indicator and a transmission rank of the current beam. The radio transceiver device comprises a determine module configured to determine an adjustment indicator for adjusting beam width of the current beam for continued communications with said another radio transceiver device. The adjustment indicator is based on the signal strength indicator and the transmission rank. The radio transceiver device comprises an initiate module configured to initiate adjustment of the beam width according to the adjustment indicator.

According to a fifth aspect there is presented a computer program for beam width adjustment. The computer program comprises computer program code which, when run on processing circuitry of a radio transceiver device, causes the radio transceiver device 200 to perform a method according to the first aspect.

According to a sixth aspect there is presented a method for receiving reporting of beam width adjustment. The method is performed by a radio transceiver device. The method comprises communicating, using a current beam, with another radio transceiver device. The current beam is associated with a signal strength indicator and a transmission rank. The method comprises receiving an adjustment indicator. The adjustment indicator reports adjustment of beam width of the current beam for continued communications with said another radio transceiver device. The adjustment indicator is based on the signal strength indicator and the transmission rank.

According to a seventh aspect there is presented a radio transceiver device for receiving reporting of beam width adjustment. The radio transceiver device comprises processing circuitry. The processing circuitry is configured to cause the radio transceiver device to communicate, using a current beam, with another radio transceiver device. The current beam is associated with a signal strength indicator and a transmission rank. The processing circuitry is configured to cause the radio transceiver device to receive an adjustment indicator. The adjustment indicator reports adjustment of beam width of the current beam for continued communications with said another radio transceiver device. The adjustment indicator is based on the signal strength indicator and the transmission rank.

According to an eighth aspect there is presented a radio transceiver device for receiving reporting of beam width adjustment. The radio transceiver device comprises processing circuitry and a storage medium. The storage medium stores instructions that, when executed by the processing circuitry, cause the radio transceiver device to perform operations, or steps. The operations, or steps, cause the radio transceiver device to communicate, using a current beam, with another radio transceiver device. The current beam is associated with a signal strength indicator and a transmission rank. The operations, or steps, cause the radio transceiver device to receive an adjustment indicator. The adjustment indicator reports adjustment of beam width of the current beam for continued communications with said another radio transceiver device. The adjustment indicator is based on the signal strength indicator and the transmission rank.

According to a ninth aspect there is presented a radio transceiver device for receiving reporting of beam width adjustment. The radio transceiver device comprises a communicate module configured to communicate, using a current beam, with another radio transceiver device. The current beam is associated with a signal strength indicator and a transmission rank. The radio transceiver device comprises a receive module configured to receive an adjustment indicator. The adjustment indicator reports adjustment of beam width of the current beam for continued communications with said another radio transceiver device. The adjustment indicator is based on the signal strength indicator and the transmission rank.

According to a tenth aspect there is presented a computer program for receiving reporting of beam width adjustment, the computer program comprising computer program code which, when run on processing circuitry of a radio transceiver device, causes the radio transceiver device 300 to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these radio transceiver devices, and these computer programs provide efficient beam width adjustment, in turn enabling efficient beamforming and spatial multiplexing.

Advantageously these methods, these radio transceiver devices, and these computer programs result in improved throughput and capacity compared to traditional beamforming methods.

Advantageously these methods, these radio transceiver devices, and these computer programs enable a dynamic adaptation of the beam width to channel conditions, resulting in good coverage on cell edge and high throughput in the cell center.

It is to be noted that any feature of the first, second, third, fourth, fifth, sixth seventh, eight, ninth, tenth and eleventh aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
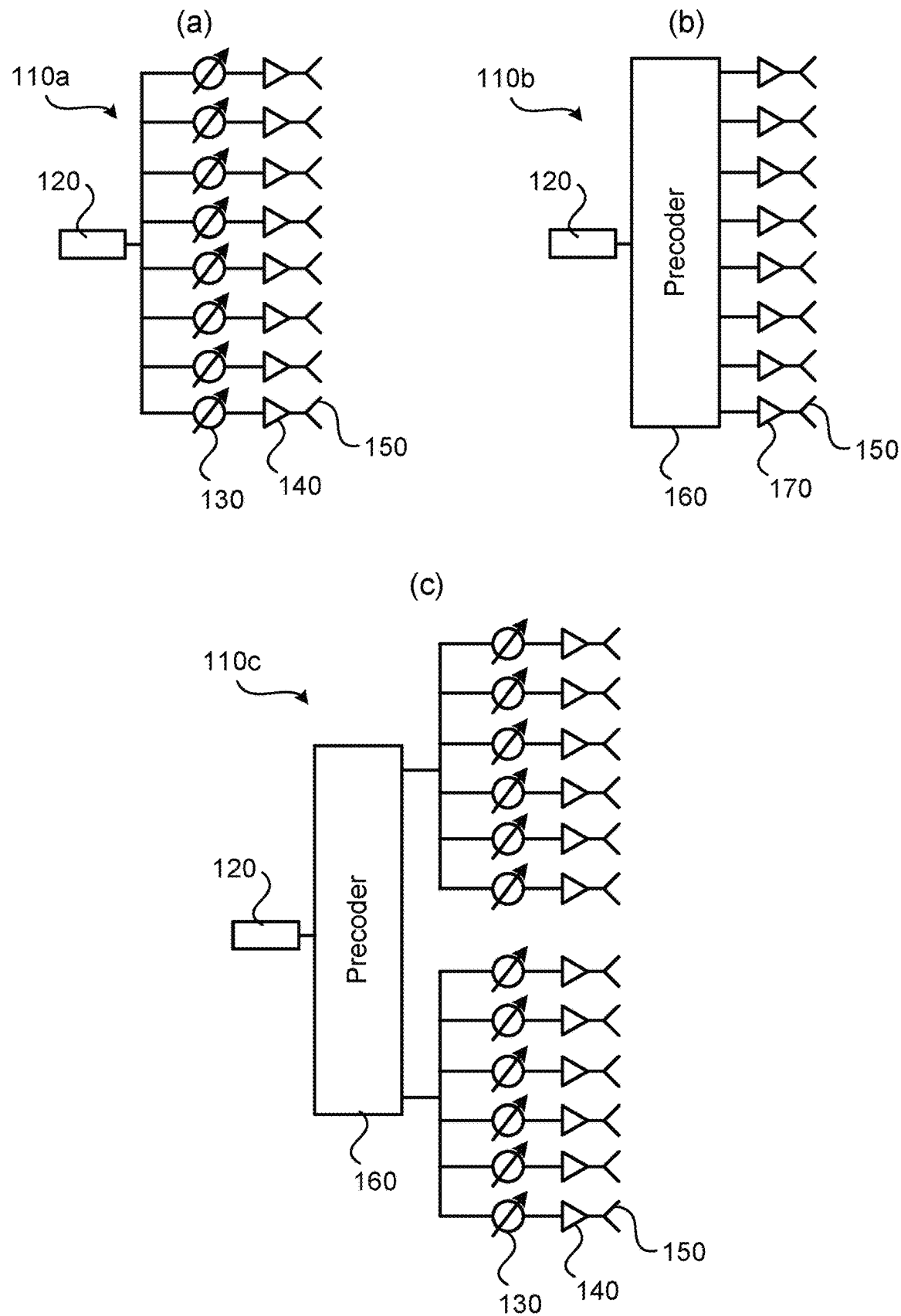
FIG. 1 is a schematic illustration of antenna arrangements according to embodiments.
Figure 2:
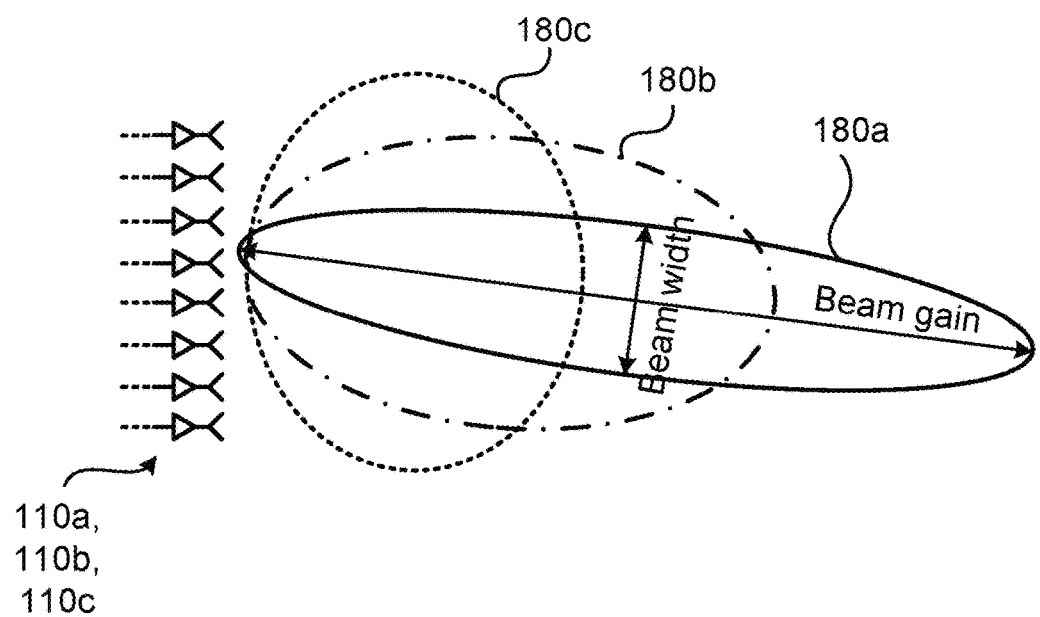
FIG. 2 is a schematic illustration of beams generated by an antenna arrangement according to embodiments.
Figure 3:
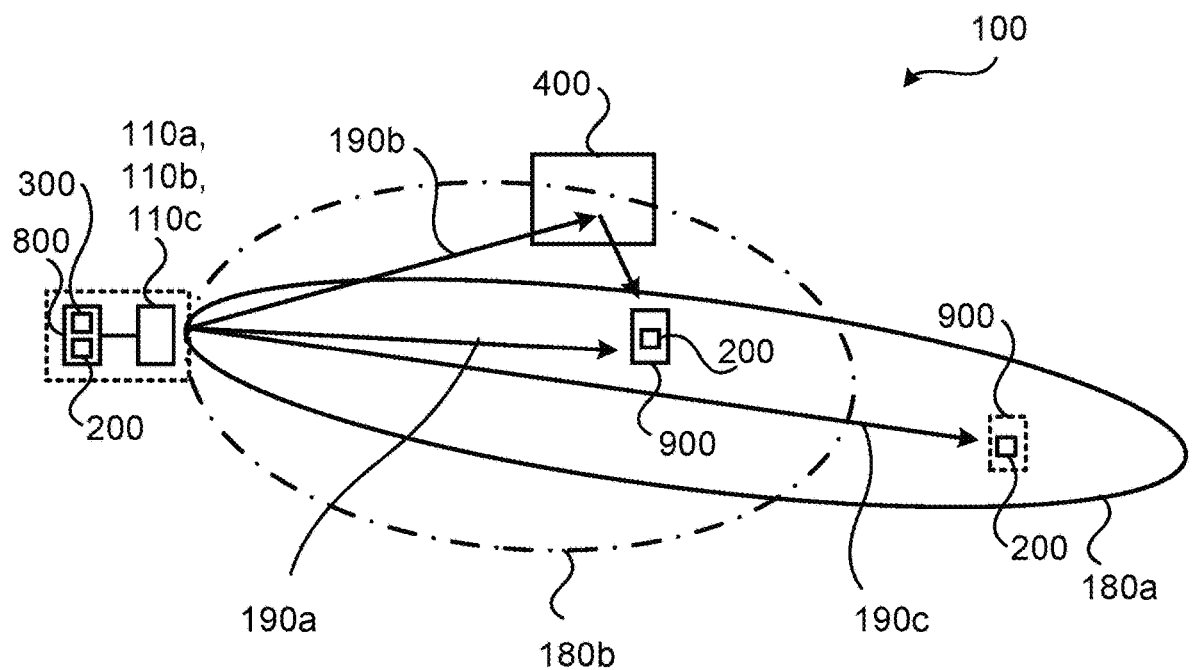
FIG. 3 is a schematic diagram illustrating a communications system according to embodiments.

FIG. 3 is a schematic diagram illustrating a communications system 100 where embodiments presented herein can be applied. The communications system 100 comprises a network node B00 providing network access to terminal devices 900 through communications links 190a, 190b, 190c.

A radio transceiver device 200 could be part of either network node B00 or terminal device 900. A radio transceiver device 300 could be part of network node B00 (or terminal device 900). Further functionality and properties of radio transceiver device 200 and radio transceiver device 300 will be disclosed below.

The network nodes B00 could be a radio access network node, radio base station, base transceiver station, Node B, evolved Node B, access point, access node, or gigabit Node B. The terminal device 900 could be a portable wireless device, mobile station, mobile phone, handset, wireless local loop phone, user equipment (UE), smartphone, laptop computer, tablet computer, wireless modem, wireless sensor device, wireless modem, or network equipped vehicle.

Communications links 190a, 190c represent direct (line of sight) links whereas communications link 190b represents an indirect (non-line of sight) link. Communications link 190b is schematically illustrated as being reflected by reflecting surface 400 on its way between network node 800 and terminal device 900. The reflecting surface 400 could be defined by a physical object, either being a stationary object (such as a building, a rock, etc.) or being a moving object (such as a moving vehicle, a moving human being, etc.).

The communications links 190a, 190b, 190c are established by beams 180a, 180b being generated at an antenna arrangement 110a, 110b, 110c of network node 800. The antenna arrangement 110a, 110b, 100c could form an integral part of, be collocated with, or be physically separated from, the network node 800.

According to the illustrative example of FIG. 3, beam 180b (serving terminal device 900 with solid outline) has a larger beam width but lower beam gain than beam 180a (serving terminal device 900 with dotted outline). Further, according to the illustrative example of FIG. 3, beam 180b is wide enough to cover reflecting surface 400 thus enabling the indirect communications link 190b to be established, whereas beam 180c is so narrow that no such indirect communications link can be established.

As used herein, the term beam should be interpreted broadly. For example, in order to obtain a higher transmission rank than 1, multiple physical beams or multiple ports per beam are needed. A beam is thus defined as a radiating entity that radiates a radio propagation wave, or signal, in a certain direction, and different ports of one and the same beam could point in the same direction but having different polarization and/or phase centers. This enables one beam with several ports to be used in order to obtain higher transmission rank than 1.

As disclosed above it could be cumbersome to design good beamforming weights. In further detail, issues could appear for spatial multiplexing using a hybrid beamforming implementation when the beams are narrow compared to the angular spread in the radio propagation channel. Narrow beams will expose less reflections, resulting in a less rich radio propagation channel. This reduces the channel rank and the spatial multiplexing capacity. On the other hand, a too wide beam (wider than angular spread of the radio propagation) will result in worse radio link quality, which reduces coverage and signal strength. At least some of the herein disclosed embodiments therefore aim at performing beamforming where coverage and link quality are traded against spatial multiplexing capacity in the absence of channel state information of the full radio propagation channel.

The embodiments disclosed herein particularly relate to mechanisms for beam width adjustment and receiving reporting of beam width adjustment. In order to obtain such mechanisms there is provided a radio transceiver device 200, a method performed by radio transceiver device 200, a computer program product comprising code, for example in the form of a computer program, that when run on processing circuitry of radio transceiver device 200, causes radio transceiver device 200 to perform the method. In order to obtain such mechanisms there is further provided a radio transceiver device 300, a method performed by radio transceiver device 300, and a computer program product comprising code, for example in the form of a computer program, that when run on processing circuitry of radio transceiver device 300, causes radio transceiver device 300 to perform the method.

Figure 4:
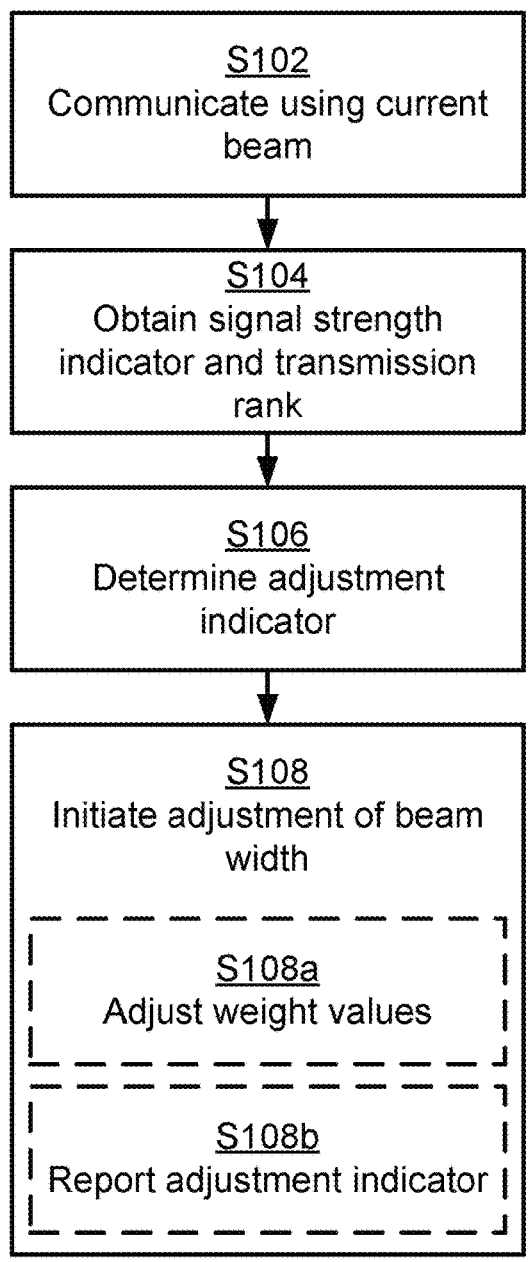
FIGS. 4 and 5 are flowcharts of methods according to embodiments.
Figure 5:
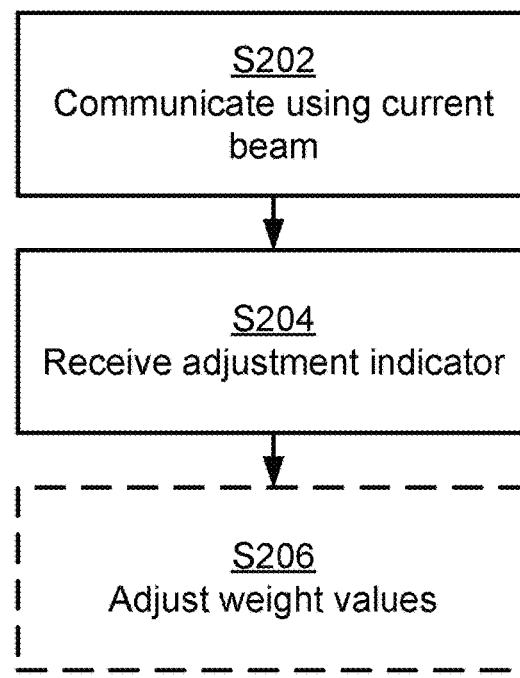

FIG. 4 is a flowchart illustrating embodiments of methods for beam width adjustment as performed by radio transceiver device 200. FIG. 5 is a flowchart illustrating embodiments of methods for receiving reporting of beam width adjustment as performed by radio transceiver device 300. The methods are advantageously provided as computer programs 1420a, 1420b.

Reference is now made to FIG. 4 illustrating a method for beam width adjustment as performed by radio transceiver device 200 according to an embodiment.

It is assumed that radio transceiver device 200 and radio transceiver device 300 communicate with each other. Hence, radio transceiver device 200 is configured to perform step S102:

S102: The radio transceiver device 200 communicates, using a current beam 180a, 180b, 180c, with another radio transceiver device 300.

Radio transceiver device 200 monitors the performance of the communications inter alia in terms of signal strength and transmission rank. Particularly, radio transceiver device 200 is configured to perform step S104:

S104: The radio transceiver device 200 obtains a signal strength indicator and a transmission rank of the current beam 180a, 180b, 180c.

Examples of signal strength indicators and transmission ranks will be disclosed below. Based on the monitored performance radio transceiver device 200 determines whether the beam width of the current beam 180a, 180b, 180c needs to be adjusted. Particularly, radio transceiver device 200 is configured to perform step S106:

S106: The radio transceiver device 200 determines an adjustment indicator for adjusting beam width of the current beam 180a, 180b, 180c for continued communications with the so-called another radio transceiver device 300. The adjustment indicator is based on the signal strength indicator and the transmission rank.

Once the adjustment indicator has been determined beam width of the current beam 180a, 180b, 180c can be adjusted accordingly. Particularly, radio transceiver device 200 is configured to perform step S108:

S108: The radio transceiver device 200 initiates adjustment of the beam width according to the adjustment indicator.

Examples of how radio transceiver device 200 could initiate adjustment of the beam width will be disclosed below.

Embodiments relating to further details of beam width adjustment as performed by radio transceiver device 200 will now be disclosed.

Radio transceiver device 200 could be part of network node 800 or terminal device 900.

There may be different ways for the radio transceiver device 200 to initiate adjustment of the beam width in step S108. Different embodiments relating thereto will now be described in turn.

In some aspects the initiating involves actual adjustment of the beam width. This could be the case radio transceiver device 200 is configured to generate the current beam 180a, 180b, 180c and/or is part of network node 800. In particular, according to an embodiment the current beam 180a, 180b, 180c is generated by beamforming of an antenna arrangement 110a, 110b, 110c of the radio transceiver device 200, and radio transceiver device 200 is configured to perform step S108a as part of initiating adjustment of beam width in step S108:

S108a: The radio transceiver device 200 adjusts the weight values of the beamforming so as to adjust the beam width of the current beam 180a, 180b, 180c according to the adjustment indicator.

Aspects of the beamforming will now be disclosed. As disclosed above, beamforming of the antenna arrangement 110a, 110b, 110c could be implemented by digital beamforming, analog beamforming or hybrid beamforming. Particularly, according to a first embodiment the weight values are precoder weights (as used by precoder 160) being applied to a signal to be transmitted by the antenna arrangement 110b, 110c. This first embodiment represents an example of digital beamforming or hybrid beamforming. According to a second embodiment the weight values are beamforming weight values being applied to the antenna arrangement 110a, 110c. Each of the beamforming weight values has a phase value (and, optionally, an amplitude value), and adjusting the beamforming weight values involves adjusting the phase values by means of phase adjusters 130 (and, optionally, the amplitude values by means of gain adjusters 140) of the beamforming weight values. This second embodiment represents an example of analog beamforming or hybrid beamforming.

The beamforming could be the same for transmission and reception, where a single adjustment indicator to used for both transmission and reception is determined in S106. The beamforming could differ between transmission and reception, and separate adjustment indicators are determined for transmission and reception. The spatial multiplexing capability may differ between uplink and downlink directions and a wider beam can be beneficial in one direction but may not improve the channel capacity in the other direction. Also the possibilities for obtaining the signal strength and transmission rank may differ between transmission and reception, motivating a difference in beamforming and adjustment indicator selection between transmission and reception. Different optional mechanisms can also be applied for transmission and reception, such as in any of steps S108a, S204, and S206.

In some aspects the initiating involves reporting the adjustment indicator to radio transceiver device 300. This could be the case radio transceiver device 200 is configured to generate the current beam 180a, 180b, 180c and/or is part of terminal device 900. In particular, according to an embodiment radio transceiver device 200 is configured to perform step S108b as part of initiating adjustment of beam width in step S108:

S108b: The radio transceiver device 200 reports the adjustment indicator to the so-called another radio transceiver device 300 for the so-called another radio transceiver device 300 to adjust the beam width according to the adjustment indicator.

Reference is now made to FIG. 5 illustrating a method for receiving reporting of beam width adjustment as performed by radio transceiver device 300 according to an embodiment.

As disclosed above, it is assumed that radio transceiver device 200 and radio transceiver device 300 communicate with each other. Hence, radio transceiver device 300 is configured to perform step S102:

S202: The radio transceiver device 300 communicates, using a current beam 180a, 180b, 180c, with another radio transceiver device 200. The current beam 180a, 180b, 180c is associated with a signal strength indicator and a transmission rank.

As disclosed above, according to an embodiment radio transceiver device 200 reports an adjustment indicator to radio transceiver device 300. Radio transceiver device 300 is therefore configured to perform step S204:

S204: The radio transceiver device 300 receives an adjustment indicator. The adjustment indicator reports adjustment of beam width of the current beam 180a, 180b, 180c for continued communications with the so-called another radio transceiver device 200. The adjustment indicator is based on the signal strength indicator and the transmission rank.

Embodiments relating to further details of receiving reporting of beam width adjustment as performed by radio transceiver device 300 will now be disclosed.

Radio transceiver device 300 could be part of network node 800, such as where the beam width of network node 800 is controlled by terminal device 900. Alternatively, transceiver device 300 could be part of terminal device 900, such as where the beam width of terminal device 900 is controlled by network node 800.

Once radio transceiver device 300 receives an adjustment indicator has received the adjustment indicator, radio transceiver device 300 could adjust the beam width accordingly. Particularly, according to an embodiment the current beam 180a, 180b, 180c is generated by beamforming of an antenna arrangement 110a, 110b, 110c of the radio transceiver device 300 and radio transceiver device 300 is configured to perform step S206:

S206: The radio transceiver device 300 adjusts the weight values of the beamforming so as to adjust the beam width of the current beam 180a, 180b, 180c according to the adjustment indicator.

Embodiments relating to how the weight values of the beamforming could be adjusted have been disclosed above with reference to radio transceiver device 200 and are equally applicable for step S206 as performed by radio transceiver device 300.

Embodiments equally applicable to radio transceiver device 200 and radio transceiver device 300 will now be disclosed.

There could be different criteria for determining how the beam width is to be adjusted. Aspects relating thereto will now be disclosed.

When there is low transmission rank and sufficient signal strength the beam width is, if possible, increased to capture more reflections, aiming for a richer radio propagation channel and higher channel rank.

That is, according to an embodiment the adjustment indicator is determined so as to increase the beam width of the current beam 180a, 180b, 180c when the transmission rank is below a first threshold value. According to an embodiment the adjustment indicator is determined so as to increase the beam width of the current beam 180a, 180b, 180c when the signal strength indicator is above a second threshold value. In some aspects the adjustment indicator is determined so as to increase the beam width of the current beam 180a, 180b, 180c only when the transmission rank is below the first threshold value and the signal strength indicator is above the second threshold value. Details of the first threshold value and the second threshold value will be disclosed below.

In more detail, a wider beam might be used to capture more surrounding reflecting objects and surfaces 400 to get a richer radio propagation channel. This might increase the channel rank and the spatial multiplexing capacity, which might improve the throughput of the communications links 190a, 190b, 190c. However, as a consequence of using wider beam the antenna gain might typically be reduced.

If perfect reciprocity based conjugate beam shaping can be assumed the signal strength will not be reduced if utilizing all strong paths 190a, 190b. But with simpler beam forming the signal strength will in many cases be reduced when power is transmitted also in directions where no strong reflection path is present. This gain loss will reduce the signal strength and SINR, which might reduce the throughput of the communications links 190a, 190b, 190c.

When the signal strength is low the beam width is, if possible, decreased to maintain coverage. That is, according to an embodiment the adjustment indicator is determined so as to decrease the beam width of the current beam 180a, 180b, 180c when the signal strength indicator is below a third threshold value. According to an embodiment the adjustment indicator is determined so as to decrease the beam width of the current beam 180a, 180b, 180c when the transmission rank is above a fourth threshold value. In some aspects the adjustment indicator is determined so as to decrease the beam width of the current beam 180a, 180b, 180c only when the signal strength indicator is below the third threshold value and the transmission rank is above the fourth threshold value.

Details of the third threshold value and the fourth threshold value will be disclosed below.

In more detail, in some environments the radio propagation channel is rich also with a narrow beam, depending on surrounding objects. The optimal beam width will vary and is dependent (when the beam is assumed to be used for transmission to terminal device 900) on the position of terminal device 900 as well as the physical orientation of terminal device 900 and non-stationary objects surrounding terminal device 900.

Details of the first, second, third, and fourth threshold values will now be disclosed.

Any of the first threshold value, the second threshold value, the third threshold value, and the fourth threshold value could either be fixed or dependent on at least one other parameter, such as any of the signal strength indicator, the transmission rank, and the current beam width of the current beam 180a, 180b, 180c. The latter allows the threshold values to be set adaptively based on what performance, such as in terms of signal strength, transmission rank, throughput, etc., is expected for the current beam width. It could be that the first threshold value is identical to the fourth threshold value, and/or that the second threshold value is identical to the third threshold value. However, it could be that not to threshold values are identical in order to avoid toggling of the beam width between two beam widths. Different threshold values can be used for transmission and reception.

There could be different examples of signal strength indicators. For example, the signal strength indicator could be represented by a signal to noise ratio (SNR) value, a signal to interference plus noise ratio (SINR) value, a path loss value, or a channel quality indicator (CQI) value. The signal strength indicator could indicate link quality measures.

There could be different examples of transmission ranks. For example, the transmission rank could be represented by a channel rank value, a spatial multiplexing rank value, channel state information (CSI) report, a singular value ratio (SVR), a condition number, or a rank indicator (RI). The transmission rank might thus, for example, be measured as the actual transmitted spatial multiplexing rank (such as based on CSI), or be measured on the MIMO channel (in terms of SVR or condition number).

The transmission rank and the signal strength indicator could be measured either at the beamforming side (such as at network node 800) or at the other end (such as at the terminal device 900) of the communications links 190a, 190b, 190c and reported back to the beamforming side. Thus, the transmission rank could be the transmission rank as measured by either radio transceiver device 200 or radio transceiver device 300 and thus represent the transmitted rank of either radio transceiver device 200 or radio transceiver device 300.

In some aspects the transmission rank and the signal strength indicator are combined into a channel capacity measure. Thus, according to an embodiment the signal strength indicator and the transmission rank are jointly obtained as a channel capacity measure. The channel capacity measure can thereby be used as the adjustment indicator In some aspects the channel capacity measure represents mutual Information and/or MIMO channel bitrate. That is, according to an embodiment radio transceiver device 200 communicates with radio transceiver device 300 over a MIMO channel, and the channel capacity measure represents at least one of information theoretic mutual information, and channel bitrate of the MIMO channel.

The trade-off between the signal strength indicator and the transmission rank can be tuned to maximize the throughput of the radio link between radio transceiver device 200 and radio transceiver device 300. Hence, according to an embodiment the adjustment indicator is determined with an object to improve throughput of the communication between radio transceiver device 200 and radio transceiver device 300.

In some aspects the beam width is adjusted step by step whilst searching for a maximum throughput. In particular, according to an embodiment the adjusting of the weight values (in step S108a or step S206) involves the beam width to be iteratively adjusted according to the adjustment indicator until at least a local maximum of the throughput is found. One new value of the adjustment indicator might thus be needed at each step of the iteration in order for such an iterative adjustment of the beam width to be performed.

A first particular embodiment based on at least some of the above embodiments will now be disclosed. The first particular embodiment is based on CSI feedback applied at a network node 800 with digital beamforming. Hence, in this first particular embodiment the radio transceiver device 200 is part of network node 800.

Radio transceiver device 200 selects a current beam width and a corresponding set of precoders for the antenna arrangement.

Radio transceiver device 200 transmits CSI-RS with the current beam width using the selected set of precoders.

Radio transceiver device 200 receives a CSI report from radio transceiver device 300, where the CSI report comprises a CQI value and a RI value.

Radio transceiver device 200, if the RI value is low, such as if the RI value equals 1 (rank-1), and the CQI value is above a threshold, adjusts the phase shift and amplitude set of the precoder to generate a beam that is wider than the current beam.

A second particular embodiment based on at least some of the above embodiments will now be disclosed. The second particular embodiment is based on DMRS for both uplink transmission and downlink reception in a terminal device 900 with hybrid beamforming. Hence, in this second particular embodiment the radio transceiver device 200 is part of network node 900.

Radio transceiver device 200 selects a current beam width and a corresponding set of phase shift values and amplitude values for the antenna arrangements.

Radio transceiver device 200 receives a transmission with DMRS reference symbols embedded from radio transceiver device 300.

Radio transceiver device 200 estimates the SVR and SNR based on DMRS channel estimation on all user layers.

Radio transceiver device 200 calculates information theoretic mutual information and estimates the derivatives thereof in SVR and SNR dimensions.

Radio transceiver device 200, if the derivative is larger in SNR dimension than in SVR dimension, adjusts the set of phase shift values and amplitude values to generate a beam that is narrower than the current beam.

In summary, the herein disclosed embodiments could be applied to a radio transceiver device 200 being an integral part of, collocated with, or at least controlling, a MIMO node with dynamic beamforming capability under conditions of restricted CSI, i.e. where there are more beamforming degrees of freedom than what can be directly observed in the radio propagation channel. Further, the herein disclosed embodiments could be applied both on the transmitting side and the receiving side. Further, the herein disclosed embodiments could be applied both at the user side, such as in a terminal device 900, and at the network side, such as in a network node 800.

Figure 6:
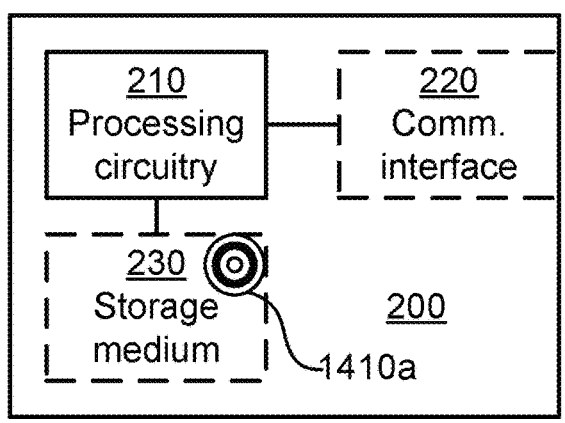
FIG. 6 is a schematic diagram showing functional units of a radio transceiver device according to an embodiment.

FIG. 6 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410a (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-S108b, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The radio transceiver device 200 may further comprise a communications interface 220 for communications at least with radio transceiver device 300. As such the communications interface 220 may comprise one or more transmitters and receivers, comprising analogue and digital components.

The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 7:
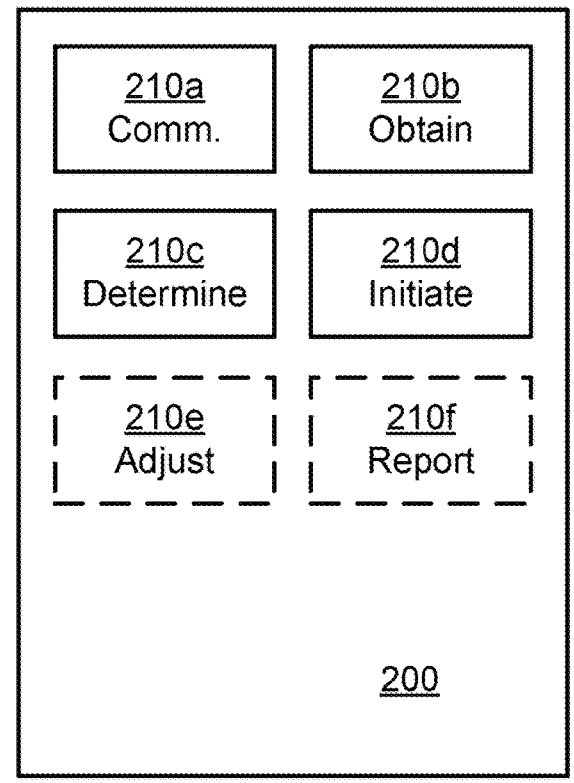
FIG. 7 is a schematic diagram showing functional modules of a radio transceiver device according to an embodiment.

FIG. 7 schematically illustrates, in terms of a number of functional modules, the components of a radio transceiver device 200 according to an embodiment. The radio transceiver device 200 of FIG. 7 comprises a number of functional modules; a communicate module 210a configured to perform step S102, an obtain module 210b configured to perform step S104, a determine module 210c configured to perform step S106, and an initiate module 210d configured to perform step S108. The radio transceiver device 200 of FIG. 7 may further comprise a number of optional functional modules, such as any of an adjust module 210e configured to perform step S108a, and a report module 210f configured to perform step S108b. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210f and to execute these instructions, thereby performing any steps of the radio transceiver device 200 as disclosed herein.

Figure 8:
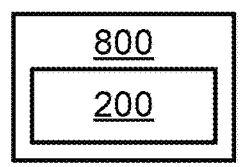
FIG. 8 is a schematic diagram of a radio access network node comprising a radio transceiver device according to an embodiment.
Figure 9:
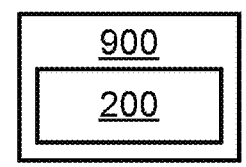
FIG. 9 is a schematic diagram of a terminal device comprising a radio transceiver device according to an embodiment.

The radio transceiver device 200 may be provided as a standalone device or as a part of at least one further device. For example, the radio transceiver device 200 may be implemented in, part of, or co-located with, a radio access network node 800 (as in FIG. 8) or a terminal device 900 (as in FIG. 9). Hence, according to some aspects there is provided a radio access network node 800 and/or a terminal device 900 comprising a radio transceiver device 200 as herein disclosed.

Further, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 6 the processing circuitry 210 may be distributed among a plurality of devices, or nodes. The same applies to the functional modules 210a-210f of FIG. 7 and the computer program 1420a of FIG. 14 (see below).

Figure 10:
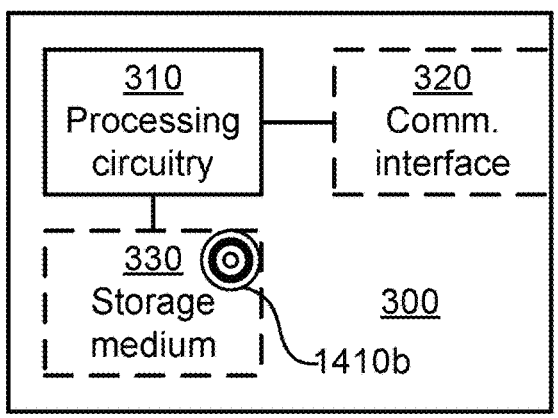
FIG. 10 is a schematic diagram showing functional units of a radio transceiver device according to an embodiment.

FIG. 10 schematically illustrates, in terms of a number of functional units, the components of a radio transceiver device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 14100b (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the radio transceiver device 300 to perform a set of operations, or steps, S202-S206, as disclosed above. For example, the storage medium 330 may store the set of operations, and the processing circuitry 310 may be configured to retrieve the set of operations from the storage medium 330 to cause the radio transceiver device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The radio transceiver device 300 may further comprise a communications interface 320 for communications at least with radio transceiver device 200. As such the communications interface 320 may comprise one or more transmitters and receivers, comprising analogue and digital components.

The processing circuitry 310 controls the general operation of the radio transceiver device 300 e.g. by sending data and control signals to the communications interface 320 and the storage medium 330, by receiving data and reports from the communications interface 320, and by retrieving data and instructions from the storage medium 330. Other components, as well as the related functionality, of the radio transceiver device 300 are omitted in order not to obscure the concepts presented herein.

Figure 11:
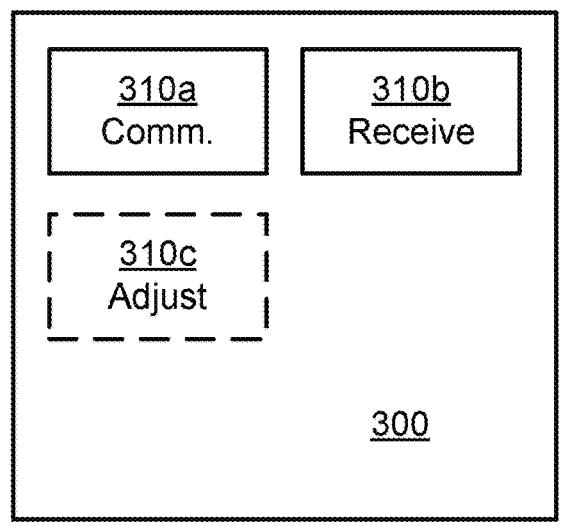
FIG. 11 is a schematic diagram showing functional modules of a radio transceiver device according to an embodiment.

FIG. 11 schematically illustrates, in terms of a number of functional modules, the components of a radio transceiver device 300 according to an embodiment. The radio transceiver device 300 of FIG. 11 comprises a number of functional modules; a communicate module 310a configured to perform step S202, and a receive module 310b configured to perform step S204. The radio transceiver device 300 of FIG. 11 may further comprise a number of optional functional modules, such as an adjust module 310c configured to perform step S206. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the radio transceiver device 300 as disclosed herein.

Figure 12:
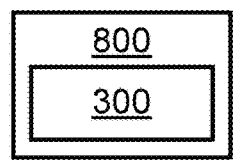
FIG. 12 is a schematic diagram of a terminal device comprising a radio transceiver device according to an embodiment.
Figure 13:
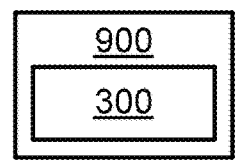
FIG. 13 is a schematic diagram of a terminal device comprising a radio transceiver device according to an embodiment.

The radio transceiver device 300 may be provided as a standalone device or as a part of at least one further device. For example, the radio transceiver device 300 may be implemented in, part of, or co-located with, a radio access network node 800 (as in FIG. 12) or a terminal device 900 (as in FIG. 13). Hence, according to some aspects there is provided a radio access network node 800 and/or a terminal device 900 comprising a radio transceiver device as herein disclosed.

Further, a first portion of the instructions performed by the radio transceiver device 300 may be executed in a first device, and a second portion of the of the instructions performed by the radio transceiver device 300 may be executed in a second device; the herein disclosed embodiments are not limited to any particular number of devices on which the instructions performed by the radio transceiver device 300 may be executed. Hence, the methods according to the herein disclosed embodiments are suitable to be performed by a radio transceiver device 300 residing in a cloud computational environment. Therefore, although a single processing circuitry 310 is illustrated in FIG. 10 the processing circuitry 310 may be distributed among a plurality of devices, or nodes. The same applies to the functional modules 310a-310c of FIG. 11 and the computer program 1420a of FIG. 14 (see below).

Figure 14:
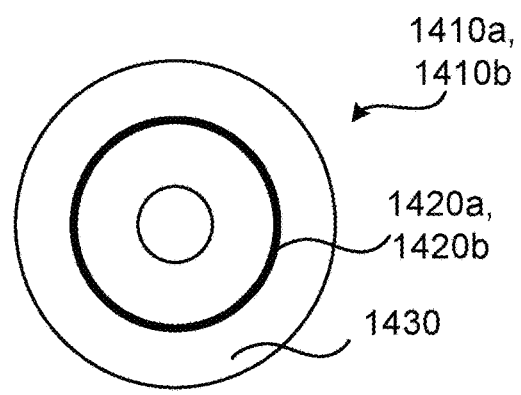
FIG. 14 shows one example of a computer program product comprising computer readable means according to an embodiment.

FIG. 14 shows one example of a computer program product 1410a, 1410b comprising computer readable means 1430. On this computer readable means 1430, a computer program 1420a can be stored, which computer program 1420a can cause the processing circuitry 210 and thereto operatively coupled entities and devices, such as the communications interface 220 and the storage medium 230, to execute methods according to embodiments described herein. The computer program 1420a and/or computer program product 1410a may thus provide means for performing any steps of the radio transceiver device 200 as herein disclosed. On this computer readable means 1430, a computer program 1420b can be stored, which computer program 1420b can cause the processing circuitry 310 and thereto operatively coupled entities and devices, such as the communications interface 320 and the storage medium 330, to execute methods according to embodiments described herein. The computer program 1420b and/or computer program product 14100b may thus provide means for performing any steps of the radio transceiver device 300 as herein disclosed.

In the example of FIG. 14, the computer program product 1410a, 1410b is illustrated as an optical disc, such as a CD (compact disc) or a DVD (digital versatile disc) or a Blu-Ray disc. The computer program product 1410a, 1410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420a, 1420b is here schematically shown as a track on the depicted optical disk, the computer program 1420a, 1420b can be stored in any way which is suitable for the computer program product 1410a, 1410b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam width adjustment, the method being performed by a radio transceiver device, the method comprising:
communicating, using a current beam, with another radio transceiver device;
obtaining a signal strength indicator and a transmission rank of the current beam;
determining an adjustment indicator for adjusting beam width of the current beam for continued communications with said another radio transceiver device, the adjustment indicator being based on the signal strength indicator and the transmission rank, the signal strength indicator being represented by at least one of a signal to noise ratio, SNR value, a signal to interference plus noise ratio, SINR value, and a path loss value; and
initiating adjustment of the beam width according to the adjustment indicator.

2. The method according to claim 1, wherein the current beam is generated by beamforming of an antenna arrangement of the radio transceiver device, and wherein initiating adjustment of beam width comprises:
adjusting the weight values of the beamforming so as to adjust the beam width of the current beam according to the adjustment indicator.

3. The method according to claim 2, wherein the weight values are precoder weights being applied to a signal to be transmitted by the antenna arrangement.

4. The method according to claim 2, wherein the weight values are beamforming weight values being applied to the antenna arrangement, wherein each of the beamforming weight values has a phase value, and wherein adjusting the beamforming weight values involves adjusting the phase values of the beamforming weight values.

5. The method according to claim 2, wherein adjusting the weight values involves the beam width to be iteratively adjusted according to the adjustment indicator until at least a local maximum of the throughput is found.

6. The method according to claim 1, wherein initiating adjustment of beam width comprises:
reporting the adjustment indicator to said another radio transceiver device for said another radio transceiver device to adjust the beam width according to the adjustment indicator.

7. The method according to claim 1, wherein the adjustment indicator is determined with an object to improve throughput of said communicating with said another radio transceiver device.

8. The method according to claim 1, wherein the adjustment indicator is determined so as to increase the beam width of the current beam when the transmission rank is below a first threshold value.

9. The method according to claim 8, wherein any of the first threshold value, the second threshold value, the third threshold value, and the fourth threshold value are either fixed or dependent on at least one of the signal strength indicator, the transmission rank, and current beam width of the current beam.

10. The method according to claim 1, wherein the adjustment indicator is determined so as to increase the beam width of the current beam when the signal strength indicator is above a second threshold value.

11. The method according to claim 1, wherein the adjustment indicator is determined so as to decrease the beam width of the current beam when the signal strength indicator is below a third threshold value.

12. The method according to claim 1, wherein the adjustment indicator is determined so as to decrease the beam width of the current beam when the transmission rank is above a fourth threshold value.

13. The method according to claim 1, wherein the transmission rank is represented by a channel rank value, a spatial multiplexing rank value, channel state information, CSI, report, a singular value ratio, SVR, a condition number, or a rank indicator, RI.

14. The method according to claim 1, wherein the signal strength indicator and the transmission rank are jointly obtained as a channel capacity measure.

15. The method according to claim 14, wherein the radio transceiver device communicates with said another radio transceiver device over a multiple input multiple output, MIMO, channel, and wherein the channel capacity measure represents at least one of information theoretic mutual information, and channel bitrate of the MIMO channel.

16. A method for receiving reporting of beam width adjustment, the method being performed by a radio transceiver device, the method comprising:
communicating, using a current beam, with another radio transceiver device, the current beam being associated with a signal strength indicator and a transmission rank; and
receiving an adjustment indicator, the adjustment indicator reporting adjustment of beam width of the current beam for continued communications with said another radio transceiver device, the adjustment indicator being based on the signal strength indicator and the transmission rank, the signal strength indicator being represented by at least one of a signal to noise ratio, SNR value, a signal to interference plus noise ratio, SINR value, and a path loss value.

17. The method according to claim 16, wherein the current beam is generated by beamforming of an antenna arrangement of the radio transceiver device, the method further comprising:
adjusting the weight values of the beamforming so as to adjust the beam width of the current beam according to the adjustment indicator.

18. A radio transceiver device for beam width adjustment, the radio transceiver device comprising processing circuitry, the processing circuitry being configured to cause the radio transceiver device to:
communicate, using a current beam, with another radio transceiver device;
obtain a signal strength indicator and a transmission rank of the current beam;
determine an adjustment indicator for adjusting beam width of the current beam for continued communications with said another radio transceiver device, the adjustment indicator being based on the signal strength indicator and the transmission rank, the signal strength indicator being represented by at least one of a signal to noise ratio, SNR value, a signal to interference plus noise ratio, SINR value, and a path loss value; and
initiate adjustment of the beam width according to the adjustment indicator.

19. A radio transceiver device for beam width adjustment, the radio transceiver device comprising:
processing circuitry; and
a storage medium storing instructions that, when executed by the processing circuitry, cause the radio transceiver device to:
communicate, using a current beam, with another radio transceiver device;
obtain a signal strength indicator and a transmission rank of the current beam;
determine an adjustment indicator for adjusting beam width of the current beam for continued communications with said another radio transceiver device, the adjustment indicator being based on the signal strength indicator and the transmission rank, the signal strength indicator being represented by at least one of a signal to noise ratio, SNR value, a signal to interference plus noise ratio, SINR value, and a path loss value; and
initiate adjustment of the beam width according to the adjustment indicator.

20. A radio transceiver device for beam width adjustment, the radio transceiver device comprising:
a communicate module configured to communicate, using a current beam, with another radio transceiver device;
an obtain module configured to obtain a signal strength indicator and a transmission rank of the current beam;
a determine module configured to determine an adjustment indicator for adjusting beam width of the current beam for continued communications with said another radio transceiver device, the adjustment indicator being based on the signal strength indicator and the transmission rank, the signal strength indicator being represented by at least one of a signal to noise ratio, SNR value, a signal to interference plus noise ratio, SINR value, and a path loss value; and
an initiate module configured to initiate adjustment of the beam width according to the adjustment indicator.

21. A radio transceiver device for receiving reporting of beam width adjustment, the radio transceiver device comprising processing circuitry, the processing circuitry being configured to cause the radio transceiver device to:
communicate, using a current beam, with another radio transceiver device, the current beam being associated with a signal strength indicator and a transmission rank; and
receive an adjustment indicator, the adjustment indicator reporting adjustment of beam width of the current beam for continued communications with said another radio transceiver device, the adjustment indicator being based on the signal strength indicator and the transmission rank, the signal strength indicator being represented by at least one of a signal to noise ratio, SNR value, a signal to interference plus noise ratio, SINR value, and a path loss value.

22. A radio transceiver device for receiving reporting of beam width adjustment, the radio transceiver device comprising:
processing circuitry; and
a storage medium storing instructions that, when executed by the processing circuitry, cause the radio transceiver device to:
communicate, using a current beam, with another radio transceiver device, the current beam being associated with a signal strength indicator and a transmission rank; and receive an adjustment indicator, the adjustment indicator reporting adjustment of beam width of the current beam for continued communications with said another radio transceiver device, the adjustment indicator being based on the signal strength indicator and the transmission rank, the signal strength indicator being represented by at least one of a signal to noise ratio, SNR value, a signal to interference plus noise ratio, SINR value, and a path loss value.

23. A radio transceiver device for receiving reporting of beam width adjustment, the radio transceiver device comprising:
   a communicate module configured to communicate, using a current beam, with another radio transceiver device, the current beam being associated with a signal strength indicator and a transmission rank; and
   a receive module configured to receive an adjustment indicator, the adjustment indicator reporting adjustment of beam width of the current beam for continued communications with said another radio transceiver device, the adjustment indicator being based on the signal strength indicator and the transmission rank, the signal strength indicator being represented by at least one of a signal to noise ratio, SNR value, a signal to interference plus noise ratio, SINR value, and a path loss value.

24. A non-transitory storage medium storing a computer program for beam width adjustment, the computer program comprising computer code which, when run on processing circuitry of a radio transceiver device, causes the radio transceiver device to:
   communicate, using a current beam, with another radio transceiver device;
   obtain a signal strength indicator and a transmission rank of the current beam;
   determine an adjustment indicator for adjusting beam width of the current beam for continued communications with said another radio transceiver device, the adjustment indicator being based on the signal strength indicator and the transmission rank, the signal strength indicator being represented by at least one of a signal to noise ratio, SNR value, a signal to interference plus noise ratio, SINR value, and a path loss value; and
   initiate adjustment of the beam width according to the adjustment indicator.

25. A non-transitory storage medium storing a computer program for receiving reporting of beam width adjustment, the computer program comprising computer code which, when run on processing circuitry of a radio transceiver device, causes the radio transceiver device to:
   communicate, using a current beam, with another radio transceiver device, the current beam being associated with a signal strength indicator and a transmission rank; and
   receive an adjustment indicator, the adjustment indicator reporting adjustment of beam width of the current beam for continued communications with said another radio transceiver device, the adjustment indicator being based on the signal strength indicator and the transmission rank, the signal strength indicator being represented by at least one of a signal to noise ratio, SNR value, a signal to interference plus noise ratio, SINR value, and a path loss value.

* * * * *